C. E. BRIDGES.
ENGINE STARTER.
APPLICATION FILED NOV. 16, 1912.
1,114,852.
Patented Oct. 27, 1914.
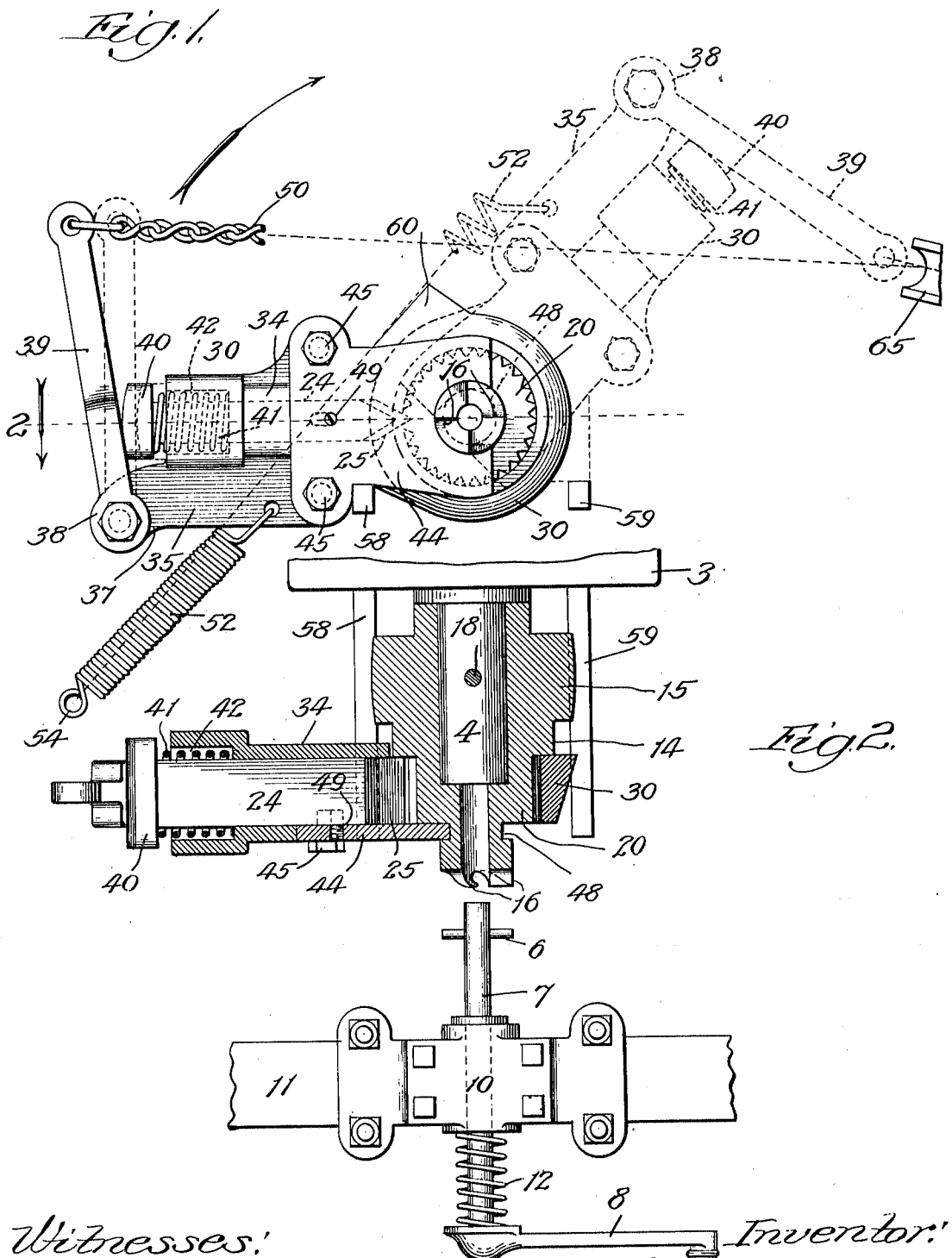
Witnesses:
E. C. Taylor.
Chas. H. Buell
Inventor:
Charles E. Bridges,
By Hirschl & Hirschl
Attys.

UNITED STATES PATENT OFFICE.

CHARLES E. BRIDGES, OF CHICAGO, ILLINOIS.

ENGINE-STARTER.

1,114,852.  Specification of Letters Patent.  Patented Oct. 27, 1914.

Application filed November 16, 1912. Serial No. 731,689.

*To all whom it may concern:*

Be it known that I, CHARLES E. BRIDGES, a citizen of the United States, residing at No. 4537 Whipple street, Chicago, in the county of Cook and State of Illinois, have invented new and useful Improvements in Engine-Starters, of which the following is a specification.

This invention relates to engine starters or means for setting in operation an internal combustion engine of the kind commonly used in motor cars, which, as is well known require to be initially set in motion before they will perform their regular functions and continue in operation unaided by the application of external forces. Most commonly such engines have heretofore been provided with hand cranks or handles on the ends of their crank shafts by which such crank shafts could be rotated for the purpose of setting the various parts of the engine in operation, and more recently mechanical devices of different sorts have been provided for the purpose of causing such initial rotation in other manners.

One of the objects of the present invention is to provide a mechanical device for setting such an engine in operation, which device may be actuated by the operator while seated in the vehicle in the ordinary position assumed while driving or riding in such vehicle. It is also well known that occasionally through defects in the operation of the various parts of an engine or through carelessness in their adjustment an engine when initially rotated for the purpose of setting it in operation may start backward, or back-fire as it is called, causing the starting crank to be whirled violently around in a reverse direction with consequent danger of injuring the operator.

Another object of the present invention is to provide a starting device of such form as to cause the parts engaging with the engine crank shaft to be released in case of such a back-fire in order to avoid any damage or injury either to the apparatus or to the operator.

A device embodying the principles of the present invention is here shown and described as applied to an engine and vehicle of well known and approved construction, and is designed for attachment to such an engine and vehicle without any substantial alteration of the latter. Such device is shown in the accompanying drawings in which:

Figure 1 is a view of the device in front elevation. Fig. 2 is a horizontal section on the line 2 of Fig. 1.

As shown in said drawings the vehicle is provided with an engine, the forward part of the crank case of which is indicated at 3, and the forward end of the crank shaft is shown extended through the crank case at 4. The device as it is here illustrated is designed more particularly for use in connection with a type of vehicle of which a large number are at present in use, or for use on vehicles substantially similar to it, and such vehicles are ordinarily equipped with a belt pulley on the end of the shaft 4 for driving a cooling fan mounted behind the radiator of the vehicle. The hub of such pulley is somewhat wider than the length of the projecting shaft 4 and is formed with notches or claws on its front end designed for engagement by a pin 6 fixed radially through the inner end of a shaft 7 which is provided at its other end with a crank arm 8 and a handle 9; the whole comprising the familiar starting crank which is commonly found on the front end of a gasolene motor car. The shaft 7 of the starting crank has its bearing in a bracket 10 bolted to the forward cross frame member 11 of the vehicle and is free to slide endwise in such bearing, being pressed outward by a spring 12, whereby it is normally kept out of engagement with the crank shaft. These parts are included in the regular equipment of the vehicle, and their particular construction is no part of the present invention. In fitting my improved device to such a vehicle it is intended that the belt pulley above described be removed from the shaft 4 and for it is substituted a cylindric member 14 which is shaped to provide a belt pulley 15 and a hub similarly extended forward and provided with claws 16 for engagement by the pin 6 in the end of the starting crank; whereby the original starting equipment of the car is substantially retained for use in case of failure of the other parts hereinafter described, or when otherwise desired. The pulley 15 is non-rotatively fixed on the shaft 4 by means of a pin 18 which is driven through it. The part 14 is formed with an integral notched wheel 20 the circumference of which is formed with notches or teeth somewhat similar to gear teeth, but with their faces more nearly tangential than gear teeth are ordinarily made; and such notches are designed for engagement by a part 24 having its inner end 25 wedge-shaped at an angle corresponding with the shape of the notches. There is also provided a frame member 30 which comprises an integral hub part through which is made a large cylindric opening of the same diameter as the diameter of the notched wheel 20 and such hub part is adapted to fit over and rotate upon the notched wheel, by which it is supported. A radial extension 34 from the hub part contains the part 24 which is rectangular in cross-section and mounted to slide radially in a correspondingly shaped opening through the length of the part 34; whereby the inner wedge-shaped end 25 may be engaged with and disengaged from the notches on the wheel 20. It will be seen therefore that the member 30 may be non-rotatively fixed to the shaft 4 by engaging the sliding part 24 with the notches in the notched wheel, whereby the whole constitutes in effect a crank arm by means of which the shaft 4 may be rotated; and that the radial part 30 may rotate freely about its bearing upon the end of the shaft when the parts are disengaged by sliding the member 24 outward. The frame part 30 with its hub part and radial extension 34 is strengthened by an integral web or flange 35.

Upon the outer end of the web part 35, and upon its lowest side when viewed in the position shown in Fig. 1, is made an extension 37 having an opening therethrough in which is pivoted the forked lower end 38 of a lever 39. The lever 39 extends thence upward over the end of the sliding block 24 and the latter has its outer end made with a rounded head 40 which may be pressed upon by the lever 39 to slide the sliding block 24 inward and engage its wedge-shaped inner end in the notches on the notched wheel 20. A spring 41, coiled about the shank part of the sliding member 24 and accommodated in an enlargement 42 of the opening through the part 34, bears against the head 40 and acts to press the sliding part 24 outward and out of engagement with the notched wheel 20.

The frame member 30 is retained in place with its hub part supported upon the notched wheel 20 by means of a flat plate 44, secured upon its front surface as by means of studs 45, and such flat plate is made with its inner end forked and designed to engage in an annular groove 48 in the hub of the part 14 to prevent the device from sliding off the notched wheel 20. A screw or pin 49 extending through the plate 44 and into a groove in the sliding part 24 limits the latter's outward movement.

A chain, or cable 50 is secured in the free end of the lever 39, by means of which a pull may be placed upon the outer part of the device to rotate it in the direction indicated by the large arrow, and a coiled spring 52, hooked into an opening in the web part 35 of the device and having its opposite end formed with an eye 54 for attachment to any convenient part of the vehicle, acts to rotate the device in the opposite direction. The rotation of the entire device in the last described direction under the influence of the spring 52 is limited by a stop 58 extending from the engine crank case 3, and in the opposite direction by a similar stop 59; the hub part of the member 30 being provided with a radial extension 60 for engagement with the last mentioned stop. The two stops 58 and 59, as here shown, are indicated diagrammatically merely, and in the form of vehicle for which the device here shown has been more especially designed, these stops constitute parts of the ordinary mechanical equipment of the vehicle; but it is evident that where the device is used in a vehicle differently designed and arranged, suitable stops of other form may be provided, if necessary, for limiting the rotative movement of the device. The device is applied to the vehicle by first removing the ordinary belt pulley which is provided for driving the air circulating fan ordinarily mounted behind the radiator of the vehicle, and fixing in its stead the part 14 on the end of the crank shaft. If the distance between the ends of the shafts 7 and 4 is not large enough to permit the complete device being thus placed in position, the part 14 alone may be introduced as above described, and then the frame part 30 assembled over the notched wheel 20 and secured in place by the plate 44. A pulley 65 of any suitable form; is fixed to the frame of the vehicle or to any convenient part of its equipment at the side of the vehicle and arranged to conduct the chain 50 upwardly and rearwardly in order that it may be led through the dash board of the vehicle and pulled upon by a person seated in the vehicle; its upper end being provided with a suitable handle for such purpose.

The operation of the device is as follows: When the device is in its initial position shown in Fig. 1, where it is ordinarily retained by means of the spring 52, and the chain 50 is slightly slackened, the spring 41 acts to push the sliding block 24 outward and disengage it from the notches 20.

A pull on the chain 50, however, acts first to move the lever 39 into its first dotted position as shown and to press the sliding block 24 inward and engage it in one of the notches in the wheel 20; whereupon a further pull will rotate the device and with it the shaft 4 until the entire device is brought into the angular position shown in dotted outline in Fig. 1, where it is evident that the pull on the arm 39 will be in such direction as to remove its pressure from the sliding block 24 and allow the latter to slide outward and be disengaged from the wheel 20; and the chain 50 may then be released and the device allowed to resume its initial position for another effort if necessary. In case of a back kick during the operation of the device, the reverse rotation of the wheel 20 will either reversely rotate the entire device and cause the chain to be pulled from the hand of the operator, in which case the pressure will be removed from the sliding block 24 and the latter thereby released from engagement with the wheel 20; or, if the chain is too strongly grasped for such release, excessive pressure of the notched wheel upon the sliding wedge member 24 will, by reason of the inclination of the engaging parts, force the latter outward and free the parts from engagement.

I claim as my invention:

1. In a starting device, the combination with an engine shaft, of a wheel fixed thereto, a movable member and a relatively movable part adapted to engage such wheel and apply a rotative effort thereto in an operative direction, and to slip upon such wheel with an excess of resistance of such wheel against rotation in such direction, a chain arranged to impart movement to such movable member, and means operating through the tension of such chain to bring such relatively movable part into engagement with such wheel, such means including an intermediate member between the chain and such movable member adapted to multiply the pressure exerted by the tension of the chain on such relatively movable part.

2. In a starting device, the combination with an engine shaft, of a notched wheel fixed thereto, a movable member and a relatively movable part adapted to engage the notches of such wheel and apply pressure thereto in a direction inclined to the planes of their faces, and to slip past such notches with an excess pressure between such faces and such part, a chain arranged to impart movement to such movable member, and means operating through the tension of such chain to bring such relatively movable part into engagement with the notched wheel, such means including an intermediate member between the chain and such movable member adapted to multiply the pressure exerted by the tension of the chain on such relatively movable part.

3. In a starting device, the combination with an engine shaft, of a wheel fixed thereto, a notch in such wheel, a rotative member and a relatively movable part having a surface adapted to engage the surface of such notch and apply pressure thereto, one of such engaging surfaces being inclined with respect to the radius of such wheel, whereby such engaging surfaces are adapted to slip upon each other with an excess pressure between them, a second relatively movable part carried by such rotative member, and a chain attached to such second relatively movable part and arranged to rotate such rotative member, such second relatively movable part being adapted to bring such first relatively movable part into engagement with the notched wheel.

4. In a starting device, the combination with an engine shaft, of a wheel on such shaft having teeth with inclined faces, a rotative member and a relatively movable part adapted to engage with the inclined faces of such teeth, a chain arranged to rotate such rotative member, and means operating through the tension of such chain to bring such relatively movable part into engagement with the inclined faces of such teeth, such means including an intermediate member between the chain and such rotative member adapted to multiply the pressure exerted by the tension of the chain on such relatively movable part.

5. The combination with an engine shaft, of a notched wheel fixed thereto, a radial member mounted on such shaft, a sliding member having a wedge-shaped end adapted to yieldingly engage with such notched wheel, a movable part carried by such radial member, and a chain attached to such movable part and arranged to rotate such radial member, such movable part being adapted to press upon said sliding member and bring it into engagement with the notched wheel.

6. In a starting device, the combination with an engine shaft, of a notched wheel fixed thereto, a radial member pivoted to rotate about such wheel, a sliding wedge-member carried by such radial member and adapted to yieldingly engage such notched wheel, a lever pivoted to the outer part of such radial member and adapted to press inward on such sliding wedge-member, and a chain attached to such lever and arranged to impart angular movement to the device.

7. In a starting device, the combination with an engine shaft and a starting crank for rotating the same, of a notched wheel fixed on the end of such shaft and having claws for engagement with such starting crank, a pivoted radial member adapted to rotate about the axis of such notched wheel, a sliding wedge-member in such radial member, a pivoted lever adapted to press inward upon such wedge-member, and a chain attached to such lever and arranged to impart angular movement to the device.

In witness whereof, I have hereunto subscribed my name in the presence of two witnesses this 9th day of November, 1912.

CHARLES E. BRIDGES.

Witnesses:
E. RAPHAEL NOURSE,
LILLIAN E. CHRISTIANSON.